Oct. 15, 1940.  P. FROST ET AL  2,217,861
CAMERA WITH EXPOSURE METER
Filed May 2, 1936
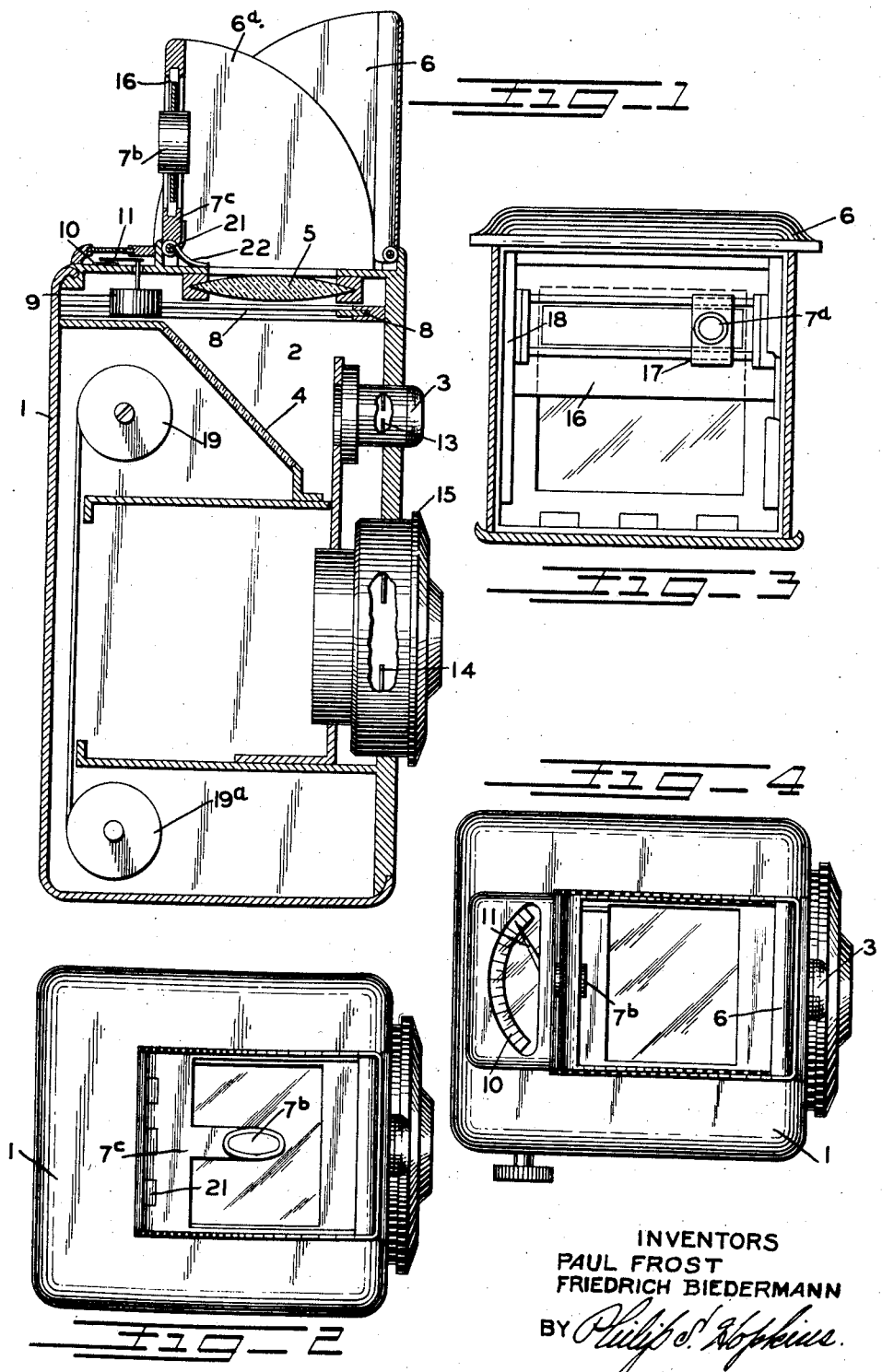
INVENTORS
PAUL FROST
FRIEDRICH BIEDERMANN
ATTORNEY Patented Oct. 15, 1940

2,217,861

UNITED STATES PATENT OFFICE 2,217,861

CAMERA WITH EXPOSURE METER

Paul Frost, Munich-Neuharlaching, and Friedrich Biedermann, Munich, Germany, assignors, by mesne assignments, to General Aniline & Film Corporation, New York, N. Y., a corporation of Delaware Application May 2, 1936, Serial No. 77,634
In Germany May 2, 1935

7 Claims. (Cl. 88—23)

Our present invention relates to a camera provided with an exposure meter.

One of its objects is a camera in which the exposure meter is connected with the finder. Another object is an exposure meter connected with a finder in which only the brightness of the part of the object to be photographed is measured, which is important for the picture. Further objects will be seen from the detailed specification following hereafter.

With the measuring instruments hitherto in use the character of the image was not taken into account in any way. If for instance a person wearing a dark dress was to be photographed in front of a white, sunlit wall, the measuring instrument showed the brightness of the wall and not of the person to be taken. The same applies to taking persons at the seaside or in a group, where the sky takes the greatest part of the picture. As a finder is absolutely necessary for focussing the desired part of the picture to be taken and for light measurement, the light-sensitive measuring instrument is built into the finder of photographic or cinematographic cameras and is preferably combined with the finder of a camera provided with a finder lens operated together with the objective of the camera and combined with a reflector.

According to the invention the light sensitive cell that is to say a cell of the cuprous oxide type is arranged at the collapsible finder-hood. To avoid the above mentioned drawbacks the cell has only the size of the spot determining the character of the image and is for instance of circular or elliptical shape. As the spot most important for the picture is not always in the center of the picture, the cell may be mounted slidably in a frame.

A finder combined with a photo-electric exposure meter may be built into all cinematographic or photographic cameras which have a relatively large focussing screen or finder lens, that is to say, of approximately the size of the picture. The galvanometer may be fixedly or removably mounted. The magnet of the built-in measuring instrument is mounted preferably in annular form around the focussing screen. The hand of the galvanometer may sweep over a scale arranged above the objective to indicate the brightness of the object to be taken. In the case of a camera provided with a finder lens operated together with the objective, the diaphragm of the finder lens may be coupled with the diaphragm of the taking objective. In this case after adjusting the diaphragm the exposure time may be read immediately on the scale of the light sensitive exposure meter.

By means of the described apparatus the sensitiveness of the photographic material, the filter factor, etc., may be taken into account in a well known manner by inserting a filter or a grey wedge or the like above the photo-electric cell, or by altering the measuring resistance.

In the accompanying drawing in which is shown one embodiment of our invention

Fig. 1 is a sectional side view of a camera with a reflex-finder,

Fig. 2 is a plan view of the finder hood the lid provided with the light sensitive cell being folded down, Fig. 3 is a modification of the lid provided with the light sensitive cell with the cell slidably mounted, and Fig. 4 is a plan view of the camera shown in Fig. 1.

The invention is described with reference to a roll film camera provided with a reflex-finder. Above the exposure camera 1 is the finder chamber 2 which is formed by the finder objective 3, the mirror 4 and the ground glass screen or field lens 5. In order to avoid disturbing side light the ground glass screen 5 is protected in well known manner by collapsible lids 6, 6a. According to the invention a light sensitive blocking-layer cell 7a or 7b is pivotally mounted in the position of one lid. After having selected the desired picture section, the cell support 7c is hinged down to the ground glass 5 against the action of a spring 22. By this movement the galvanometer 8, 9 which is mounted below the focussing screen in circuit with the cell will cause on the scale 10 a deflection of the hand 11 in accordance with the light flux. The magnet mounted annularly or in the shape of a frame around the ground glass screen is designated by 8, while the moving coil is denoted by 9. If the diaphragm 13 of the finder objective is coupled with the diaphragm 14 of the exposure objective 15, the correct exposure time can be read immediately on the scale 10 of the galvanometer. The exposure times indicated on the objective mount 15 which may also be read from above, can easily be brought to agree with the measured value. The lead which connects the cell 7 and the magnet system 9 is not shown.

The spot which is most important for the image character is mostly in the middle zone, because important objects, for instance, persons, will never be placed into the corners of the picture. Therefore it will generally suffice to give the cell 7a a circular shape or an elliptical shape (7b) and to mount it in such a way that it folds down to the middle of the finder. Such a cell and such a mounting is illustrated in Figures 1 and 2. The cell 7b which is of elliptical shape, and the cell 7a of circular shape are mounted on the hinged arm 7c, pivoted at 21. Inasmuch as the cell does not cover the whole surface of the finder it is possible that during the light measurement the image may be judged in respect of its clearness and of its size, thus avoiding a blind measuring. To take into account the character of a picture the most important part of which is not in the central zone, the cell 7a is shown slidably mounted on a frame 16 as in Figure 3. Since the cell 7a is movable in transverse direction by means of a pin and slot connection 17 and in longitudinal direction by means of a slide 18 guided by the frame 16, the cell 7a can be selectively laid over practically every part of the ground glass of the finder. Conventional film spools 19 and 19a are shown in their normal position in the camera.

What we claim is:

1. A photographic camera comprising a finder having a viewing screen for receiving the image of the object to be taken, a light sensitive cell of smaller size than said viewing screen pivotally mounted adjacent said finder so that it may be brought into overlying contact with said viewing screen for measuring the brightness of the image on said viewing screen, said cell being adjustably mounted for selective positioning over any portion of said screen and a galvanometer electrically connected to said light sensitive cell.

2. A photographic camera comprising a finder having a viewing screen for receiving the image of the object to be taken, a light sensitive cell of smaller size than said viewing screen, a shiftable support for said light sensitive cell, said support being pivotally mounted adjacent said finder so that said cell may be brought into overlying contact with any selected part of said viewing screen for measuring the brightness of the image on said viewing screen, and a galvanometer electrically connected to said cell.

3. A photographic camera comprising a finder having a viewing screen for receiving the image of the object to be taken, a light sensitive cell of smaller size than said viewing screen, said cell being pivotally mounted adjacent said finder so that it may be brought into overlying contact with said viewing screen for measuring the brightness of the image on said viewing screen and a galvanometer mounted adjacent said viewing screen, said galvanometer including a scale, a pointer playing over said scale, a rotatably mounted coil carrying said pointer electrically connected to said cell, an open ring magnet encircling said viewing screen and said coil, said scale and said pointer being mounted in such a way that they may be read when looking at the viewing screen of said finder.

4. A camera provided with a picture-taking lens and a finder lens, means for stopping down both of said lenses, a shutter for said picture-taking lens, a mirror and a focusing screen for said finder lens, all in operative relation, a light-sensitive cell mounted on and structurally connected to the camera above and in proximity to and so as to have functioning position against the focusing screen, so that the light to be measured by said cell passes through the focusing screen while the image is focused thereon, said light-sensitive cell being of markedly less area than that of the focusing screen, so that, with said cell in functioning position against the screen, the image may nevertheless be effectively studied on the said screen outside the contour of the cell, and an electric meter carried by the camera and electrically connected to said cell, whereby the shutter speed may be definitely determined at the time of focusing.

5. A camera provided with a picture-taking lens and a finder lens, means for stopping down both of said lenses, a shutter for said picture-taking lens, a mirror and a focusing screen for said finder lens, all in operative relation, a light-sensitive cell mounted on and structurally connected to the camera above and in proximity to and so as to have functioning position against the focusing screen, so that the light to be measured by said cell passes through the focusing screen while the image is focused thereon, said light-sensitive cell being of markedly less area than that of the focusing screen, so that, with said cell in functioning position against the screen, the image may nevertheless be effectively studied on the said screen outside the contour of the cell, and an electric meter carried by the camera and electrically connected to said cell, whereby the shutter speed may be definitely determined at the time of focusing, said cell being adjustably mounted for selective positioning over any portion of said screen.

6. A camera provided with a picture-taking lens and a finder lens, means for stopping down both of said lenses, a shutter for said picture-taking lens, a mirror and a focusing screen for said finder lens, all in operative relation, a light-sensitive cell movably but structurally mounted thereon above the focusing screen thereof, so that it may be shifted into and out of functioning position with relation to the screen, said cell being of markedly less area than that of the focusing screen, so that, with said cell in functioning position against the screen, the image may nevertheless be effectively studied on the said screen outside the contour of the cell, the construction of the camera and said parts being such that the light to be measured passes in an uninterrupted beam through the finder lens and in said uninterrupted condition is diffused on the focusing screen, and an electric meter carried by the camera and electrically connected to the said cell.

7. A camera provided with a picture-taking lens and a finder lens, means for stopping down both of said lenses, a shutter for said picture-taking lens, a mirror and a focusing screen for said finder lens, all in operative relation, a light-sensitive cell movably but structurally mounted thereon above the focusing screen thereof, so that it may be shifted into and out of functioning position with relation to the screen, said cell being of markedly less area than that of the focusing screen, so that, with said cell in functioning position against the screen, the image may nevertheless be effectively studied on the said screen outside the contour of the cell, the construction of the camera and said parts being such that the light to be measured by said cell passes in an uninterrupted beam through the finder lens and in said uninterrupted condition is diffused on the focusing screen, and an electric meter carried by the camera and electrically connected to the said cell, said cell being adjustably mounted for selective positioning over any portion of said screen.

PAUL FROST.
FRIEDRICH BIEDERMANN.